United States Patent Office 3,295,683
Patented Jan. 3, 1967

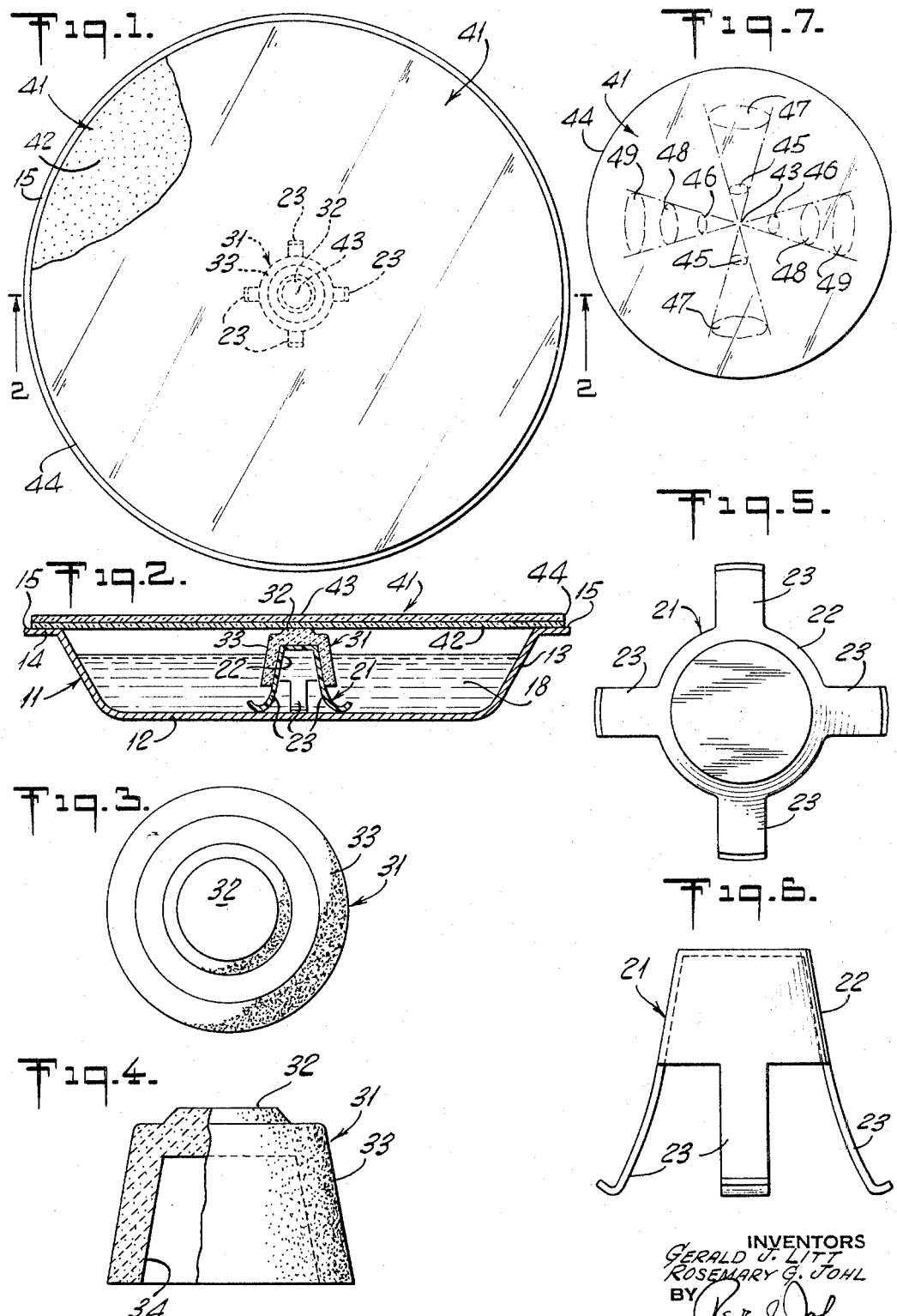

3,295,683
CIRCULAR THIN-LAYER CHROMATOGRAPHIC APPARATUS
Gerald Joseph Litt, Colonia, and Rosemary Gerheiser Johl, Matawan, N.J., assignors to Merck & Co., Inc., Rahway, N.J., a corporation of New Jersey
Filed May 28, 1965, Ser. No. 459,800
5 Claims. (Cl. 210—198)

This invention relates to circular thin-layer chromatography.

The object of the invention is to provide a circular thin-layer chromatographic apparatus that is simple and inexpensive in construction, simple and easy to use, fully satisfactory in operation and dependable and accurate in end results.

Other objects, and the features of the apparatus, will be evident from the description below, in conjunction with the accompanying drawings in which:

FIGURE 1 is a plan view of the apparatus;
FIGURE 2 is a sectional view along the line 2—2 of FIGURE 1;
FIGURE 3 is a plan view, and FIGURE 4 is a front elevation of the ceramic body employed in the apparatus, being shown on a larger scale than it is shown in FIGURES 1 and 2.
FIGURE 5 is a plan view, and FIGURE 6 is a front elevation, of the plastic body employed in the apparatus, also being shown on a larger scale than it is shown in FIGURES 1 and 2; and
FIGURE 7 is a diagrammatic view, on a reduced scale, of the thin-layer chromatographic plate after having been used in the apparatus.

Referring to FIGURES 1 and 2, the apparatus consists of a dish, generally designated 11, and preferably circular, having a flat bottom 12, a side wall 13, and a laterally projecting lip or rim 14 having an upper surface 15 that is preferably flat and in the same horizontal plane throughout.

Resting on the inside of the bottom 12 of the dish 11 is a plastic body generally designated 21, and resting on this, in turn, is a ceramic body generally designated 31. Engaging the top 32 of ceramic body 31 is the flat plate generally designated 41, the outer portion of which engages the upper surface 15 of the lip 14 of the dish 11 around the periphery of the dish, and thereby making the inside of the dish substantially vapor-tight. The dish contains a suitable solvent 18 to a depth sufficient to wet the lower portion of the side wall 33 of the ceramic body 31, as shown in FIGURE 2.

The underside of the plate 41 is coated with a thin layer 42 of a suitable chromatographic material, such as Silica Gel G according to Stahl.

The ceramic body 31, shown in more detail in FIGURES 3 and 4, is unglazed, and conveniently is an unglazed ceramic filtering crucible, used in inverted position as shown. The top surface 32 of the inverted ceramic body 31 engages the layer 42 of chromatographic material, preferably in the center area 43 of the plate, as shown. Hence, with the lower portion of the side wall 33 of the inverted ceramic body in contact with the solvent 18 in the dish 11, the ceramic body 31 serves as a wick to transport solvent 18 from the dish 11 upwardly to the center area 43 of the plate 41, from which area the solvent moves in the chromatographic material 42 radially outward toward the periphery 44 of the plate 41.

The ceramic body 31 (in the form of the inverted ceramic crucible as shown), is supported in the dish 11 by the plastic body 21. This is made of material which is inert with respect to the solvent 18, and which is somewhat flexible and elastic when in the form of a relatively thin strip of relatively narrow width. One suitable plastic is polytetrafluoroethylene, marketed under the trademark Teflon. Another is polyethylene. Preferably the plastic body 21 is washed before use with this apparatus, in order to remove any plasticizer material that might lead to chromatographic artifacts.

In construction, plastic body 21 has an upper portion that is an inverted cone, the outer side wall 22 of this inverted cone engaging the inside conical surface 34 of the side wall 33 of the ceramic body 31. The lower portion of plastic body 21 has three or more legs 23 (four are shown in the body illustrated), in the form of strip-like extensions of the upper portion. The bottoms of these legs 23 rest on the inside surface of the dish 11. Conveniently, the plastic body 21 may be a thin, hollow cone of suitable plastic, with portions of the cone in its larger diameter area removed or cut away to leave the portions 23 serving as the legs.

In assembling the parts of this apparatus, the solvent 18 is first introduced into the dish 11, and then the ceramic body 31 fitted over the plastic body 21 and the two placed in the center of the dish. The plate 41 is then positioned over the dish 11 with the coated side 42 facing downwardly (the coated side of the plate having previously had spotted on it the drops of material which are to be chromatographed). The plate 41 is centered over the dish so that its center engages the center of the top surface of the ceramic body. To assist in this, particularly where the plate 41 may have straight edges rather than a circular periphery as shown, the user may wish to remove the layer 42 over a very small diameter at the center of the plate, so that he can see through the plate and see the top surface 32 of the ceramic body 31.

Having centered the plate 41 over the top surface 32 of the ceramic body 31, the user lowers the plate 41 down onto the surface 15 of lip 14 of dish 11. In so doing, the center of the plate first engages the top surface 32 of the ceramic body, and then, while the plate is lowered so as to bring its outer area in engagement with the surface 15 of lip 14 of the dish 11, the ceramic body 31 moves downward and deforms the plastic body 21. With the construction of plastic body 21 as illustrated, the lower portions of the legs 23 bend and spread apart as the plate 41 is lowered into position.

In the assembled and operating position shown in FIGURE 2, the elasticity of the legs 23 of plastic body 21 serves to maintain the top surface 32 of ceramic body 31 in engagement with the layer of chromatographic material 42 on the underside of the plate 41, without exerting such a force as to prevent the outer area of the plate 41 from maintaining a substantially vapor-tight seal with surface 15 of the lip or rim 14 of the plate 11. A substantially solvent-saturated vapor is thus maintained between the surface of the solvent 18 and the layer of the chromatographic material 42, as is desirable for satisfactory chromatographic action.

FIGURE 7 shows a plate 41 after completion of a typical chromatographic test. At the start, before the plate 41 was lowered into position, a drop of test solution A was placed on the layer of chromatographic material 42 in each of spots 45 and dried, and a drop of test solution B was placed on the layer of chromatographic material in each of spots 46 and dried. During the chromatographic operation, the solvent 18, fed to the center 43 of the chromatographic material by the wick-like action of the ceramic body 31, moved radially outward. As the solvent passed spots 45 the ingredients of test solution A were partitioned in the solvent, and were carried radially outward. When the chromatographic operation was ended, a major ingredient of the spots 45 had been moved so that it appeared as spots 47.

As the solvent passed spots 46, the ingredients of test solution B were partitioned in the solvent and carried radially outward. When the chromatographic operation was ended, two major ingredients of the spots 46 had been moved so that one ingredient appeared as spots 48, and the other ingredient appeared as spots 49.

While the apparatus of this invention has been shown and described as using a plastic body 21 in the shape of an inverted cone with depending legs that are deformed when pressure is applied to the top of the body, the plastic body could have other shapes, including that of a helical spring fitting inside the ceramic body 31.

What is claimed is:

1. An apparatus for circular thin-layer chromatography comprising:
    (a) a dish having a relatively flat bottom surface, an upwardly extending side wall around the periphery of the dish, and a laterally projecting lip at the top of the side wall, the upper surface of the lip having at least a portion thereof extending radially outward from the center of the dish in the same horizontal plane throughout the periphery of the lip;
    (b) a flat plate engaging said upper surface of the lip around the periphery of the dish and thereby forming a vapor-restricted seal between the plate and the dish, the underside of the plate having chromatographic material adhering thereto;
    (c) a chromatographing solvent contained in the dish;
    (d) an unglazed ceramic body having a height less than the distance between the bottom inside surface of the dish and the bottom of the layer of chromatographic material on the plate, but of sufficient height to have its lower portion wetted by the solvent when its upper surface is in contact with the chromatographic material on the plate; and
    (e) a plastic body, made of a plastic which is inert with respect to the solvent and which is elastic when in relatively thin strips of relatively narrow width, positioned between the ceramic body and the bottom inside surface of the dish and supporting the ceramic body on the dish, said plastic body having sufficient inherent elasticity, due to its thinness and shape, for maintaining the top surface of the ceramic body in engagement with the chromatographic material on the plate without causing the disengagement of the periphery of the plate with the lip of the dish.

2. An apparatus as set forth in claim 1, in which the ceramic body has an internal recess extending upwardly from its lowest perimeter and in which the plastic body is a thin tube fitting into said recess with deformable legs depending below the lowest perimeter of the ceramic body.

3. An apparatus as set forth in claim 1, in which the plastic body is made of polyethylene.

4. An apparatus as set forth in claim 3, in which the plastic body has legs of a thickness of approximately 1 millimeter.

5. An apparatus for circular thin-layer chromatography comprising:
    (a) a dish having a relatively flat bottom surface, an upwardly extending side wall around the periphery of the dish, and a laterally projecting lip at the top of the side wall, the upper surface of the lip having at least a portion thereof extending radially outward from the center of the dish in the same horizontal plane throughout the periphery of the lip;
    (b) a flat plate engaging said upper surface of the lip around the eriphery of the dish and thereby forming a vapor-restricted seal between the plate and the dish, the underside of the plate having chromatographic material adhering thereto;
    (c) a chromatographing solvent contained in the dish;
    (d) an unglazed ceramic body in the shape of an inverted truncated hollow cone having a height less than the distance between the bottom inside surface of the dish and the bottom of the layer of chromatographic material on the plate, but of sufficient height to have its lower portion wetted by the solvent when its upper surface is in contact with the chromatographic material on the plate; and
    (e) a plastic body in the shape of an inverted truncated cone having approximately the same taper as the inside of the ceramic body, and having at least three substantially similar legs integral with the conical wall portion of the plastic body and extending equidistantly below the greatest diameter of the conical wall of the plastic body, said plastic body being made of a plastic which is inert with respect to the solvent and which is elastic when in relatively thin strips of relatively narrow width, and said plastic body being positioned with its conical wall inside and engaging the conical wall of the recess in the ceramic body, with the legs of the plastic body extending below the bottom of the ceramic body and resting on the dish and thereby supporting the ceramic body on the dish, with said legs having sufficient inherent elasticity, due to their thinness and shape, for maintaining the top surface of the ceramic body in engagement with the chromatographic material on the plate without causing the disengagement of the periphery of the plate with the lip of the dish.

No references cited.

REUBEN FRIEDMAN, *Primary Examiner.*

J. DE CESARE, *Assistant Examiner.*